June 30, 1936.  E. L. WALTERS  2,046,045

GLASS INSPECTION APPARATUS

Filed July 9, 1934  6 Sheets-Sheet 1

Inventor
EMMETT L. WALTERS.
By Frank Fraser
Attorney

June 30, 1936.　　　E. L. WALTERS　　　2,046,045
GLASS INSPECTION APPARATUS
Filed July 9, 1934　　　6 Sheets-Sheet 6

Inventor
EMMETT L. WALTERS.
By Frank Fraser
Attorney

Patented June 30, 1936

2,046,045

UNITED STATES PATENT OFFICE 2,046,045

GLASS INSPECTION APPARATUS

Emmett L. Walters, Toledo, Ohio, assignor to Libbey-Owens-Ford Glass Company, Toledo, Ohio, a corporation of Ohio Application July 9, 1934, Serial No. 734,418

9 Claims. (Cl. 88—14)

The present invention relates to an improved method and apparatus for inspecting sheet glass and the like.

Although the inspection apparatus herein provided has been primarily designed for use in the inspection of sheet glass to determine the degree and location of strain, ream, and other defects therein, it may also be used for the inspection of other sheet materials.

In certain processes of producing sheet glass, the sheet, after being formed, is passed horizontally through an annealing leer. As the sheet travels slowly through the leer, the internal stresses and strains are adapted to be removed therefrom and the glass gradually cooled. The sheet may be formed either in a continuous or semi-continuous operation. The inspection apparatus herein provided is particularly adapted for use in connection with a continuously formed sheet or ribbon of glass but is applicable to sheet glass produced by a semi-continuous operation and carried past the inspection apparatus in separate sheets instead of in a continuous ribbon.

According to this invention, the inspection of the glass is achieved by the use of polarized light. More particularly, polarized light is directed upwardly through the glass sheet as it is being carried forwardly to an analyzing means located thereabove and to one side thereof. The rays of polarized light passing through the glass sheet and the analyzing means will vary in color and intensity depending upon the conditions of strain, ream, and other defects in the glass so that an analysis of these light rays will serve to indicate the degree and location of the defects.

Inasmuch as the nature of polarized light and its action are well known, it is not believed necessary to enter into a detailed explanation thereof. However, it might be stated briefly at this point that light which has been polarized vibrates in only a single plane, whereas common light has transverse vibrations in all planes.

The defects present in sheet glass do not always extend in the same direction and are apt to extend in any or all directions across the plane of the glass. It has been found that streaks or bands of ream or unhomogeneity present in the glass and extending in the same plane as the polarized light or at an angle of 90 degrees thereto are not visible. On the other hand, they are most easily seen when they extend at an angle of 45 degrees with respect to the vibrations of the polarized light.

An important object of this invention is the provision of an improved method and apparatus whereby the glass sheet can be rapidly and conveniently inspected in a thorough and efficient manner as it is being carried forwardly.

Another object of the invention is the provision of an improved method and apparatus whereby the glass sheet may be inspected and marked in a substantially continuous manner as it issues from the annealing leer either in the form of a continuous ribbon or in the form of separate sheets.

Another object of the invention is the provision of an improved method and apparatus whereby all of the defects present in the glass sheet, irrespective of the direction in which they may extend, will be plainly visible and can be easily detected and marked by the inspector, thereby resulting in and facilitating a complete and thorough inspection of the said sheet throughout its entire area.

A further object of the invention is the provision of an improved apparatus designed for continuous operation at the exit end of an annealing leer and embodying means for forming two bands of polarized light extending transversely of the sheet, the rays of polarized light forming each band being all propagated to a common point, with the said bands of light of sufficient width, parallel to the travel of the glass sheet whereby a single inspector can observe and mark continuously all ream, strain, etc. present in the glass and extending in any direction by direct observation as it passes through the said apparatus.

Other objects and advantages of the invention will become more apparent during the course of the following description when taken in connection with the accompanying drawings.

In the drawings wherein like numerals are employed to designate like parts throughout the same.

Figure 1:
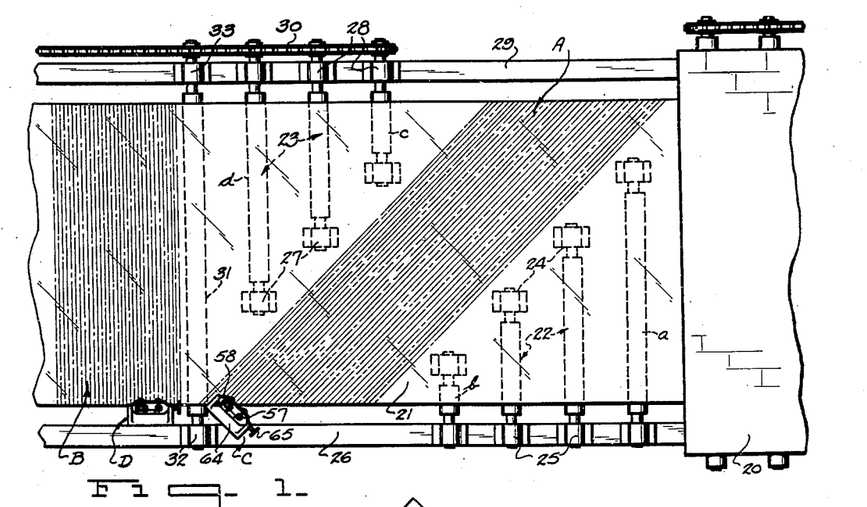
Fig. 1 is a plan view of inspection apparatus constructed in accordance with the present invention and indicating diagrammatically both the transverse and diagonal inspection of the glass sheet.

Referring now to the drawings and particularly to Fig. 1, the numeral 20 designates the outlet end of a horizontal annealing leer of any conventional or preferred construction and 21 a sheet or ribbon of glass emerging therefrom. Positioned closely adjacent the outlet end of the leer to receive the glass sheet therefrom and carry it forwardly are the two series of horizontally aligned supporting rolls 22 and 23 respectively. The rolls 22 are preferably idler rolls and are journaled at their opposite ends in bearings 24 and 25 respectively, with the bearings 25 being carried by a fixed longitudinally extending supporting member 26. These rolls diminish in length from the first roll $a$ to the last roll $b$. The rolls 23 are oppositely arranged in that they increase in length from the first roll $c$ to the last roll $d$. The rolls 23 are journaled at their opposite ends in bearings 27 and 28, with the latter bearings being carried by a longitudinally extending supporting member 29. These rolls are preferably positively driven by means of a chain and sprocket drive or the like 30.

The rolls 22 and 23 are arranged with respect to one another and to the glass sheet in the manner illustrated in Fig. 1 to facilitate the diagonal inspection of the sheet as will be more fully hereinafter apparent. After the sheet has been carried past the inspection apparatus, it may be supported upon a series of spaced aligned rolls extending transversely the entire width thereof, one of these rolls being shown at 31 and being journaled at its opposite ends in bearings 32 and 33 carried by the supporting members 26 and 29 respectively. Manifestly, however, the invention is not limited to the particular means disclosed for supporting and conveying the sheet forwardly as it leaves the annealing leer.

Briefly stated, the glass sheet 21, upon leaving the annealing leer 20, is adapted to be inspected and marked for defects in a substantially continuous manner as it is being carried forwardly. In order to effect a complete and thorough inspection of the glass, it is adapted to be inspected from two different angles by means of separate inspection apparatus so constructed and arranged as to cover the entire area of the sheet transversely thereof and render visible all of the defects therein irrespective of the direction in which they might extend. More specifically, the sheet is caused to undergo a so-called diagonal inspection and also a transverse inspection, the transverse inspection covering one-half of the area of the sheet transversely thereof and the diagonal inspection covering the other half of the area of the sheet, so that as a result a single inspector can readily observe defects extending in any direction across the glass.

As pointed out above, the inspection of the glass is herein achieved by the use of polarized light, and in carrying out the invention two separate light polarizing means are employed forming two individual bands of polarized light of sufficient width parallel to the travel of the glass sheet whereby a single inspector can observe and mark continuously all ream, strain, etc. present in the glass. Two analyzer units are also used, one for each light polarizing means. The light polarizing means are arranged beneath the glass sheet, while the analyzer units are positioned thereabove and to one side thereof. The polarized light formed by each polarizing means is propagated to a common point and it is at this point that the respective analyzer unit is positioned.

As illustrated in Fig. 1, the two bands of polarized light are indicated diagrammatically at A and B, the band of polarized light A extending at an angle of 45 degrees across the sheet, while the band B of polarized light is arranged at an angle of 90 degrees with respect to the path of travel of the glass. The band of light A is formed by the light polarizing means utilized in making the diagonal inspection and the band B created by the light polarizing means employed for effecting the transverse inspection. As stated above, the light polarizing means are arranged beneath the sheet and are therefore not shown in this figure. The two analyzer units arranged above the sheet and to one side thereof are designated C and D and are associated and adapted to cooperate respectively with the light polarizing means for creating the bands of light A and B.

Figure 4:
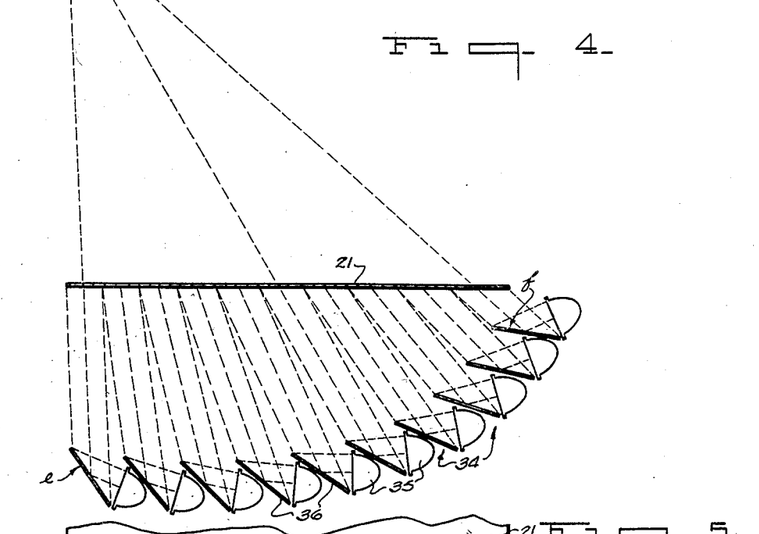
Fig. 4 is a transverse sectional view showing somewhat diagrammatically one form of light polarizing means which may be used either for the diagonal inspection or for the transverse inspection of the glass sheet.
Figure 7:
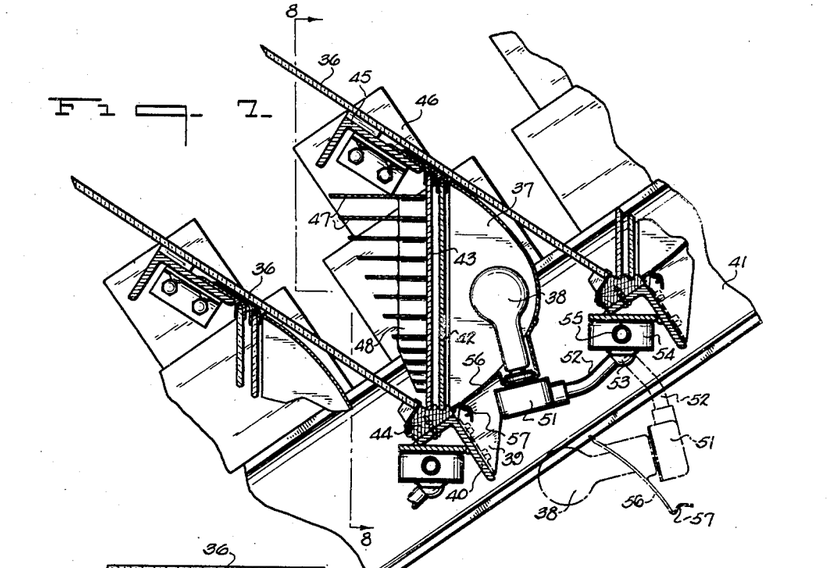
Fig. 7 is a vertical longitudinal section through a portion of the light polarizing means showing in enlarged detail one of the polarizing units.
Figure 8:
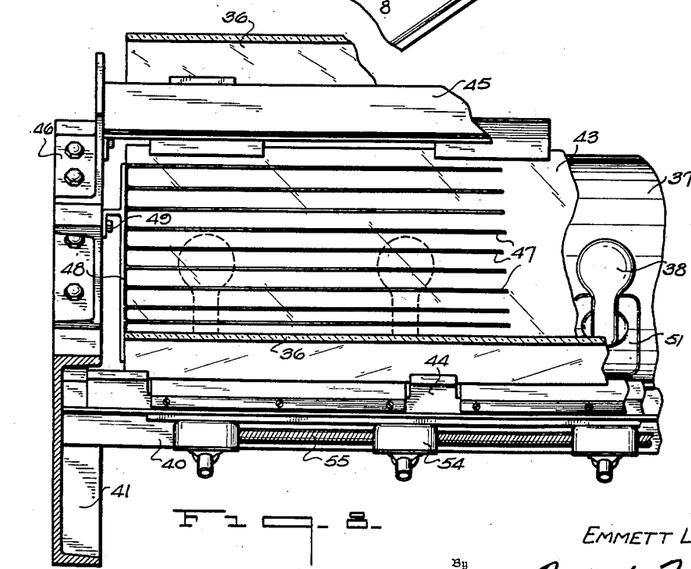
Fig. 8 is a section taken substantially on line 8—8 of Fig. 7.

The light polarizing means for forming each band of polarized light A and B may be of the construction illustrated in Figs. 4, 7 and 8. As shown particularly in Fig. 4, the polarizing means here provided consists of a plurality of relatively small polarizing units 34, each comprising a source of illumination 35 and an inclined polarizing reflector 36. The polarizing surfaces of the reflectors are arranged relative to one another in such a manner that the beams of polarized light from the center of each surface converge at a point above and to one side edge of the glass sheet being inspected. The analyzer unit C or D is adapted to be located at this apex or, in other words, at the meeting line of the beams of polarized light. It will be noted that the angle of inclination of the polarizing reflectors 36 gradually decreases from the reflector e to the reflector f, the reflector e being arranged at substantially a 60 degree angle to the horizontal while reflector f is arranged at an angle of approximately 10 degrees to the horizontal. However, the reflectors are so arranged that the angle of reflection of the rays of light from each reflector will be substantially the same.

Although a single large polarizing surface may be used if desired, a series of relatively small polarizing units 34 are preferably employed, since with such an arrangement the system is much more compact and more efficient because of the shorter distance required for the light to travel before reaching the glass sheet. Moreover, the use of a plurality of relatively small polarizing units provides cheaper cost than a single unit of sufficient size to give the required area of polarized light; also ease of maintenance and a better cooling condition in dissipating the heat generated by the source of illumination.

More specifically, and upon reference to Figs. 7 and 8, it will be seen that the source of illumination for each polarizing unit comprises an elongated reflector 37 containing a plurality of incandescent lamps 38 depending upon the width of the band of polarized light desired. The reflector 37 may be carried by a plurality of spaced brackets 39 secured to an angle iron 40 supported at each end thereof by an inclined stationary channel beam 41. Disposed in front of the incandescent lamps are the spaced parallel sheets of frosted or sand-blasted glass 42 and 43 respectively which serve to diffuse the light from the lamps, said sheets of glass being supported at their lower edges by a horizontal wooden strip 44 carried by the angle iron 40 and being suitably fastened at their upper edges to a second horizontal angle member 45 carried at each end by a bracket 46 mounted upon the channel beam 41.

Arranged in front of the diffusing plate 43 is a reflector comprising a plurality of horizontal superimposed fins 47, said fins being formed integral with or carried at each end by an end plate 48 secured by bolts or other suitable fastening elements 49 to the bracket 46. The fins 47 become progressively shorter from the top to the bottom of the reflector and are provided to prevent the source of illumination from being viewed directly from the analyzer.

Arranged in opposition to the diffusing plates 42 and 43 is the rectangular polarizing reflector 36, preferably consisting of a sheet or slab of black glass. This glass is practically opaque and is provided with a polished surface so that it forms a good reflector. The reflector is also placed at such an angle that the light from the lamps 38 will be polarized, the polarized rays being reflected upwardly through the glass sheet and respective analyzer unit in the manner explained above. The broken lines in Fig. 4 indicate the propagation of the polarized light through the sheet of glass. The polarizing reflector 36 may also be supported at its bottom edge by the horizontal wooden strip 44 and adjacent its upper end by the angle member 45 of the adjacent polarizing unit.

In order to facilitate the replacement of the incandescent lamps 38, they are mounted in such a manner that they may be swung downwardly to a position where they can be readily removed without disturbing or necessitating the dismantling of any other portion of the apparatus. Thus, each lamp is removably carried within a socket 51 carried at the forward end of a supporting arm 52 hinged as at 53 to a box 54 secured to the angle beam 40. Extending through the several boxes 54 is a cable 55 from which pass the necessary electrical connections for the lamps. When it is desired to replace one of the lamps 38, it is simply necessary to swing the lamp downwardly to the position indicated by the broken lines in Fig. 7. To permit this swinging movement of the lamp, a portion of the reflector 37 is made separate and this separate portion, designated 56, is carried by the lamp socket 51 so that it is movable therewith. When the lamp is swung upwardly into operative position as shown by the full lines in Fig. 7, it is held in place by a spring catch 57.

Figure 2:
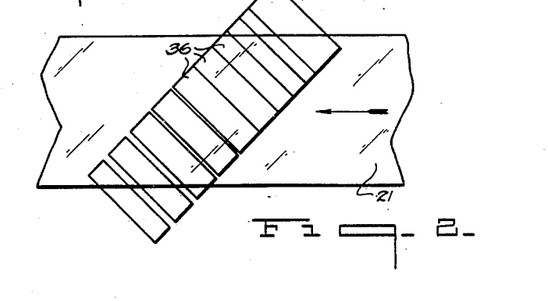
Fig. 2 is a diagrammatic plan view showing the arrangement of the polarizing reflectors for obtaining the diagonal inspection of the glass.
Figure 3:
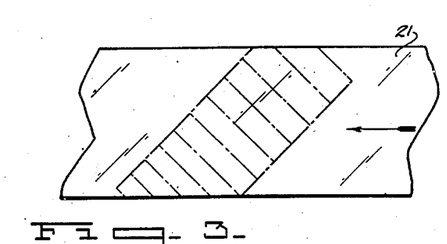
Fig. 3 is a plan view showing, in broken lines, the pattern of light formed upon the glass when the polarizing reflectors are arranged as in Fig. 2.
Figure 5:
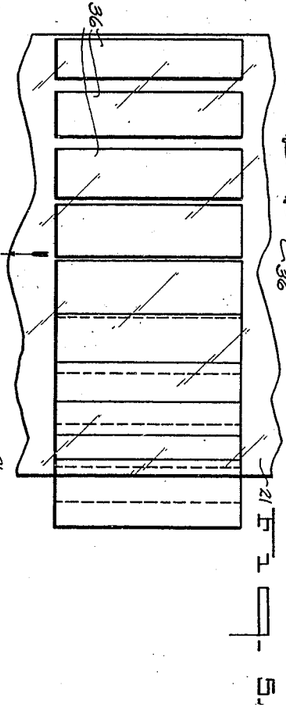
Fig. 5 is a diagrammatic plan view showing the arrangement of the polarizing reflectors for use in the transverse inspection of the glass.
Figure 6:
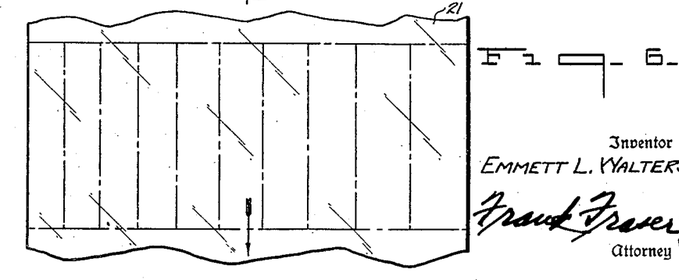
Fig. 6 is a plan view showing, in broken lines, the pattern of light formed upon the glass when the polarizing reflectors are arranged as in Fig. 5.

As set forth hereinabove, light polarizing means such as illustrated in Figs. 4, 7 and 8 may be used to accomplish both the diagonal inspection and the transverse inspection of the glass sheet. To accomplish the diagonal inspection, the polarizing units are arranged obliquely beneath the glass sheet to form the band of polarized light A, extending at an angle of 45 degrees across the sheet, and when so arranged the polarizing reflectors 36 will be disposed relative to one another as shown in Fig. 2, with the areas of light formed upon the glass by the said reflectors being indicated by the broken lines in Fig. 3. The areas of polarized light formed by the several reflectors cooperate to produce the band of light A extending diagonally of the sheet. On the other hand, when the light polarizing units are arranged to effect the transverse inspection of the glass, the polarizing reflectors 36 will extend longitudinally of the sheet and be arranged side by side transversely thereof and relative to one another as shown in Fig. 5, with the areas of light formed upon the glass by the said reflectors being indicated by the broken lines in Fig. 6. The areas of light so formed cooperate to produce the band of polarized light B.

Inasmuch as the two analyzer units C and D associated respectively with the light polarizing means for effecting the diagonal and transverse inspection of the glass are of the same construction, a detailed description of only one will be given. Thus, upon reference particularly to Figs. 13, 14 and 15, each analyzing unit consists of a pair of analyzers 57 and 58 carried by a substantially rectangular supporting plate 59 provided at its opposite ends with trunnions 60 and 61 loosely received within the legs 62 and 63 of the substantially U-shaped supporting bracket 64 which may be suitably mounted above and to one side of the path of travel of the sheet upon the horizontal supporting member 26.

Figures 9, 13, 14, 15:
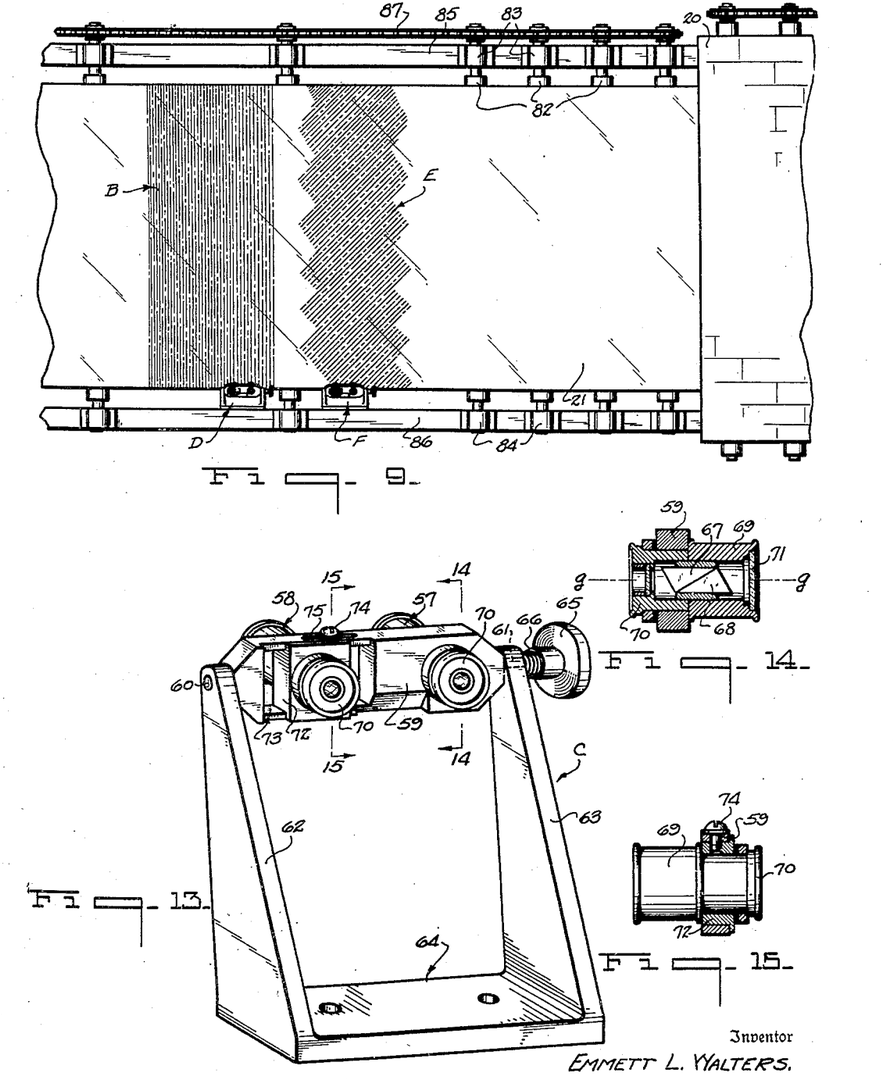
Fig. 9 is a plan view similar to Fig. 1 but embodying an alternative form of the invention for effecting the diagonal inspection of the glass sheet.
Fig. 13 is a perspective view of one of the analizing units.
Fig. 14 is a section taken substantially on line 14—14 of Fig. 13.
Fig. 15 is a section taken substantially on line 15—15 of Fig. 13.

It is preferred that two analyzers be employed so that the inspector may observe the glass sheet with both eyes. The supporting plate 59 can be rocked upon the trunnions 60 and 61 to move the analyzers into different positions to facilitate the inspection of the glass. Threaded upon the outer end of trunnion 61 is a finger piece 65 and interposed between the said finger piece and leg 63 of bracket 64 is a compression spring 66 which serves to maintain the plate 59 and likewise the analyzers 57 and 58 in adjusted position.

The analyzers 57 and 58 are of the ordinary type as indicated in Fig. 14, carrying a Nicol prism consisting of the two crystals 67 and 68 supported in a rotatable sleeve 69 so that the prism may be adjusted about its axis $g$. The sleeve 69 carries at one end thereof an eye-piece 70 and at its opposite end a mica quarter-wave or selenite plate 71 which, while preferably used, is not absolutely essential.

The analyzer 57 is stationarily mounted upon the supporting plate 59 while the analyzer 58 is movable toward and away from analyzer 57 to fit the observer's eyes. Thus, the rotatable sleeve 69 of analyzer 58 may be rotatably mounted in a substantially square block 72 slidably received within a horizontal guideway 73 in supporting plate 59. The analyzer can be secured in adjusted position by means of a set screw 74 passing through a slot 75 and received within block 72. This screw, however, is such that it will not interfere with the rotation of the analyzer about its axis g.

As brought out hereinabove, in the case of polarized light, the vibrations are all in one plane which is transverse to the direction of the rays. Therefore, before the polarized light passes through the glass sheet 21, it vibrates in only a single predetermined plane. On the other hand, the analyzing Nicols are adjusted to pass light which is vibrating only in a plane at right angles to the vibrations of the polarized light. Therefore, assuming that the glass sheet 21 was removed from the rolls 22 and 23 and all angles of propagation of the rays of polarized light were correct, no light would be seen through the analyzers. However, when the glass sheet to be inspected is carried through the inspection apparatus, the polarized light will be refracted as it passes through the glass due to the presence of strain, ream, or other defects therein, as a result of which the plane of vibration of the light will be changed so that it can be observed through the analyzers. In other words, any defects which are present in the glass sheet will cause a refraction of the rays of polarized light, resulting in their vibration in a plane approaching right angles to the plane of vibration of the polarized light and these rays can then be observed through the analyzers.

The rays of light passing through the glass sheet to the analyzers will vary in color (when using the quarter-wave or selenite plate) and intensity, depending upon the conditions of strain, ream, and other defects in the glass, and the colors and/or intensities as observed through the analyzers at different points across the sheet will indicate the condition of the glass with respect to strain, ream, etc. and any variation in these conditions is readily observed through the analyzers.

As brought out above, the defects present in sheet glass do not always extend in the same direction and through actual experiment, it has been determined that streaks or bands of ream or unhomogeneity in sheet glass are most easily observed when they extend at an angle of 45 degrees with and lateral to the vibrations of polarized light. I have discovered by further tests and experimentation that when a glass sheet is rotated about its axis parallel to the propagation of the polarized light and through an angle of 22½ degrees either side of the aforementioned angle of 45 degrees, the defects in the glass are still sufficiently visible for practical inspection.

Figure 16:
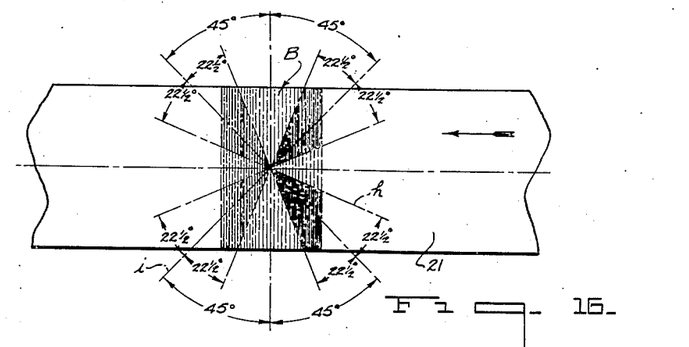
Fig. 16 is a diagrammatic plan view showing the areas of the glass sheet covered by the transverse inspection.

Therefore, when inspecting a continuous strip of moving glass, with the vibrations of polarized light extending lateral to the glass travel, (such as in effecting the transverse inspection of the glass as in Fig. 1), the zones of observation or the areas of the glass covered by the analyzing means D will be as shown by the darkened areas in Fig. 16. In other words, the areas visible for inspection will extend 22½ degrees at either side of a line extending at an angle of 45 degrees across the sheet in either direction. That is to say, during the transverse inspection, the inspector observing the glass through the analyzing means D will be able to observe all defects extending within the included angle of the darkened areas or, otherwise stated, 22½ degrees at either side of the diagonal lines h and i.

Figure 17:
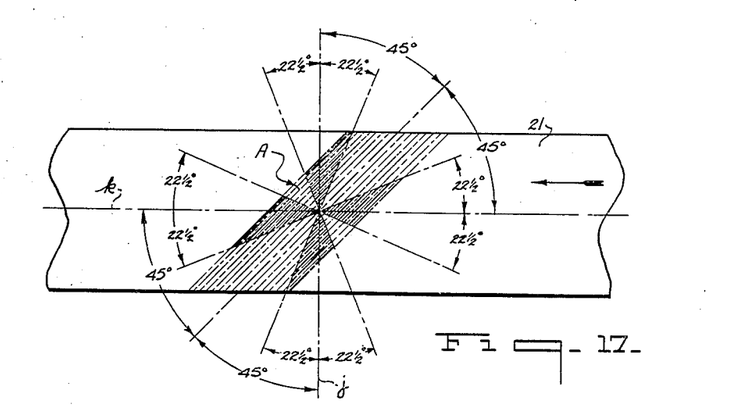
Fig. 17 is a similar view showing the areas of the sheet covered by the diagonal inspection when the polarizing reflectors are arranged as in Fig. 2.

On the other hand, with the vibrations of polarized light extending at an angle of 45 degrees with respect to the glass travel (such as in effecting the diagonal inspection of the glass also as in Fig. 1), the zones of observation or, in other words, the areas of the glass covered by the analyzing means C will be as shown by the darkened areas in Fig. 17. Thus, the areas visible for inspection will extend 22½ degrees at either side of a line drawn transversely across the sheet and also 22½ degrees at either side of a line drawn longitudinally through the center of the sheet. Hence, during the diagonal inspection, the inspector observing the glass through the analyzing means C will be able to observe all defects within the darkened areas extending 22½ degrees at either side of the transverse line j and longitudinal line k.

From the above, it will be readily apparent that when the darkened areas of the band of light A in Fig. 17 are superimposed over the darkened areas of the band of light B in Fig. 16, the entire area of the glass sheet transversely thereof will be covered by the combined diagonal and transverse inspections. The result obtained is that a single inspector can readily and conveniently observe any unhomogeneity or other defects extending in any direction across the glass through the analyzing means C and D. This inspection can be accomplished as the glass sheet is being carried forwardly so that the sheet can be inspected and marked in a substantially continuous manner. All of the defects present in the glass sheet irrespective of the direction in which they may extend will be plainly visible and can be easily detected through the analyzer units C and D, thereby permitting a complete and thorough inspection of the sheet throughout its entire area.

By arranging the two series of rolls 22 and 23 as shown in Fig. 1, it will be seen that there will be no obstruction to the rays of polarized light directed upwardly to form the band of light A, in consequence of which the sheet will be uniformly illuminated across its entire width. It is also preferred that no rolls or other supporting means be disposed between the glass sheet and the light polarizing means forming the band of light B.

In order to obtain the same results as described hereinabove with a more compact arrangement, the light polarizing means illustrated in Figs. 10 and 11 may be utilized to effect the diagonal inspection of the glass sheet in the manner illustrated in Fig. 9. The polarizing units used may be of substantially the same construction as described hereinabove, the only difference being that the polarizing reflectors 76 thereof are arranged in a new and novel manner. Thus, these reflectors extend obliquely beneath the sheet and are arranged side by side transversely thereof as shown in Fig. 11. However, while the polarizing reflectors are arranged transversely of the sheet, they actually effect the same diagonal inspection of the glass as when the polarizing reflectors are arranged at an angle of 45 degrees as in Fig. 2. Thus, the arrangement of the reflectors is such that they form a band of polarized light E (Fig. 9) extending transversely of the sheet, while the vibrations of the polarized light extend at an angle of 45 degrees with respect to the glass travel.

To obtain the above result, the polarizing reflectors 76 are tilted both laterally and longitudinally. More specifically, each reflector is tilted slightly about its longitudinal axis so that the longitudinal edge 77 thereof will be slightly above the opposite edge 78. The reflector is further tipped in a direction at right angles to bring the end edge 79 thereof slightly higher than the opposite end edge 80. The angle of lateral inclination decreases from the reflector $l$ to the reflector $m$ while at the same time the longitudinal inclination increases from reflector $l$ to reflector $m$.

Figure 10:
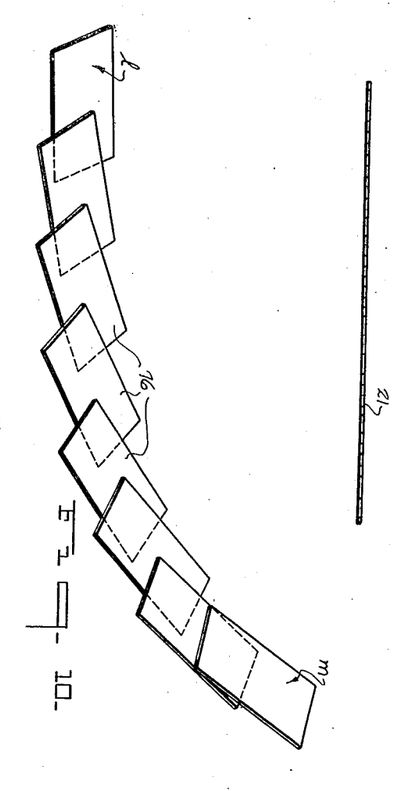
Fig. 10 is a diagrammatic transverse sectional view showing the arrangement of the polarizing reflectors for obtaining the diagonal inspection of the glass in the manner illustrated in Fig. 9.
Figure 11:
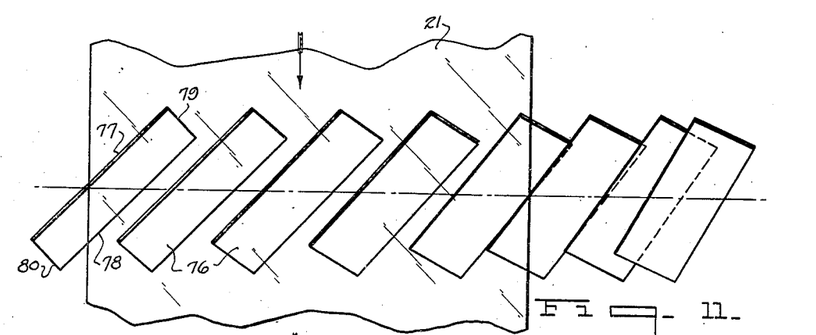
Fig. 11 is a digrammatic plan view of the reflectors of Fig. 10.
Figure 12:
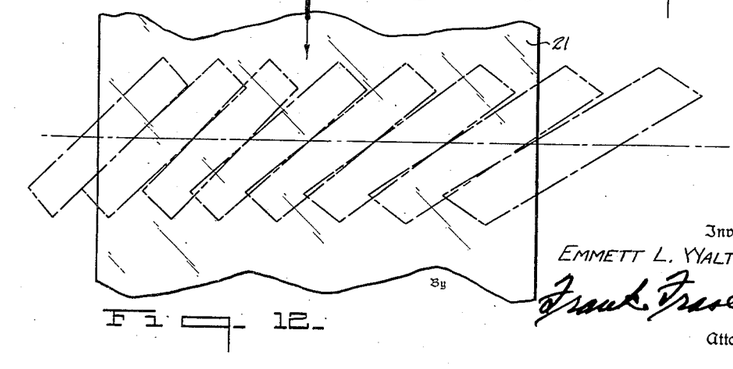
Fig. 12 is a plan view showing, in broken lines, the pattern of light formed by the reflectors when arranged as illustrated in Figs. 10 and 11.
Figure 18:
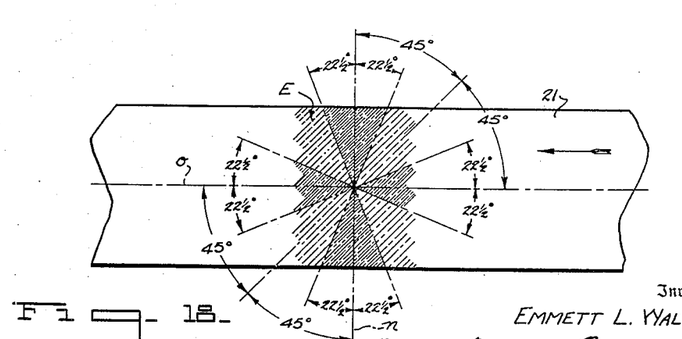
Fig. 18 is a similar view showing the areas of the sheet covered by the diagonal inspection when the polarizing reflectors are arranged as in Figs. 10 and 11.

When the reflectors are arranged beneath the glass sheet in the manner illustrated in Figs. 10 and 11, the areas of light formed thereby upon the glass will be as shown by the broken lines in Fig. 12 and which areas of light cooperate to form the band of light E (Fig. 9). Associated with the polarizing means for forming the band of light E is the analyzer unit F of the same construction and arrangement as the analyzer units C and D. The reflectors 76 are so arranged that the polarized light reflected therefrom will be propagated to a common point and will pass through the analyzer unit F to permit of the inspection of the glass. Thus, the arrangement of reflectors as shown in Figs. 10 and 11 results in the obtaining of a much more compact area required for mounting the necessary equipment, the polarizing units being set to give an area of observation as shown in Fig. 18, with the zones of observation or the areas of the glass covered by the analyzing means F being shown by the darkened areas. Hence, the areas visible for inspection will extend 22½ degrees at either side of a line drawn transversely across the sheet and also 22½ degrees at either side of a line drawn longitudinally through the center of the sheet. That is to say, during the diagonal inspection of the glass, the inspector observing the glass through the analyzing means F will be able to observe all defects within the darkened areas extending 22½ degrees at either side of the transverse line $n$ and longitudinal line $o$. It will be seen that when the darkened areas of Fig. 16 are superimposed over the darkened areas in Fig. 18, the entire area of the sheet transversely thereof will be covered by the two inspections. The transverse inspection of the glass as shown in Fig. 9 is the same as described hereinabove in connection with Fig. 1.

In Fig. 9, the glass sheet 21, upon issuing from the annealing leer 20, is received and carried forwardly upon a series of horizontally aligned rolls 82 journaled at their opposite ends in bearings 83 and 84 mounted upon fixed horizontal supports 85 and 86 respectively. The rolls 82 may be positively driven from one end through a sprocket and chain drive or the like 87. The rolls are so spaced that none of them will be disposed above the polarizing units whereby no obstruction will be offered to the rays of polarized light forming the two bands of light B and E.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In an inspection apparatus for sheet glass, the combination of means for supporting the sheet and carrying it forwardly, light polarizing means arranged at one side of the supporting means for directing polarized light through the sheet to form a band of polarized light extending across said sheet, with the vibrations of said polarized light extending substantially at an angle of 45 degrees with respect to the glass travel, separate light polarizing means also arranged at the same side of the supporting means for directing polarized light through the sheet to form a second band of polarized light extending transversely thereof, with the vibrations of said second band of polarized light extending lateral to the glass travel, and a pair of analyzer units arranged at the opposite side of the sheet supporting means, one analyzer unit being provided for and in position to receive the light transmitted through the sheet from the respective polarizing means.

2. In an inspection apparatus for sheet glass, the combination of means for supporting the sheet horizontally and carrying it forwardly, light polarizing means arranged beneath the supporting means for directing polarized light upwardly through the sheet to form a band of polarized light extending across said sheet, with the vibrations of said polarized light extending substantially at an angle of 45 degrees with respect to the glass travel, separate light polarizing means also arranged beneath the supporting means for directing polarized light upwardly through the sheet to form a second band of polarized light extending transversely thereof, with the vibrations of said second band of polarized light extending lateral to the glass travel, the rays of light from each polarizing means being propagated to a common point, and a pair of analyzer units arranged above the sheet supporting means and to one side thereof, one analyzer unit being provided for and in position to receive the light transmitted upwardly through the sheet from the respective polarizing means.

3. In an inspection apparatus for sheet glass, the combination of means for supporting the sheet and carrying it forwardly, light polarizing means arranged at one side of the supporting means for directing polarized light through the sheet and adapted to form a band of polarized light upon said sheet extending substantially at an angle of 45 degrees across the same, with the vibrations of said polarized light extending parallel to the said band of light, separate light polarizing means also arranged at the same side of the supporting means for directing polarized light through the sheet to form a second band of polarized light upon said sheet extending transversely thereof, with the vibrations of said second band of polarized light extending lateral to the glass travel, and a pair of analyzer units arranged at the opposite side of the supporting means, one analyzer unit being provided for and in position to receive the light transmitted through the sheet from the respective polarizing means.

4. In an inspection apparatus for sheet glass, the combination of means for supporting the sheet horizontally and carrying it forwardly, light polarizing means arranged beneath the supporting means for directing polarized light upwardly through the sheet and adapted to form a band of polarized light upon said sheet extending substantially at an angle of 45 degrees across the same, with the vibrations of said polarized light extending parallel to the said band of light, separate light polarizing means also arranged beneath the supporting means for directing polarized light upwardly through the sheet to form a second band of polarized light upon said sheet extending transversely thereof, with the vibrations of said second band of polarized light extending lateral to the glass travel, the rays of light from each polarizing means being propagated to a common point, and a pair of analyzer units arranged above the sheet supporting means and to one side thereof, one analyzer unit being provided for and in position to receive the light transmitted upwardly through the sheet from the respective polarizing means.

5. In an inspection apparatus for sheet glass, the combination of means for supporting the sheet and carrying it forwardly, light polarizing means arranged at one side of the supporting means for directing polarized light through the sheet to form a band of polarized light upon said sheet extending at right angles across the same, with the vibrations of said polarized light extending substantially at an angle of 45 degrees with respect to the glass travel, separate light polarizing means also arranged at the same side of the supporting means for directing polarized light through the sheet to form a second band of polarized light upon said sheet extending at right angles with respect thereto, with the vibrations of said second band of polarized light extending lateral to the glass travel, and a pair of analyzer units arranged at the opposite side of the sheet supporting means, one analyzer unit being provided for and in position to receive the light transmitted through the sheet from the respective polarizing means.

6. In an inspection apparatus for sheet glass, the combination of means for supporting the sheet horizontally and carrying it forwardly, light polarizing means arranged beneath the supporting means for directing polarized light upwardly through the sheet to form a band of polarized light upon said sheet extending at right angles across the same, with the vibrations of said polarized light extending substantially at an angle of 45 degrees with respect to the glass travel, separate light polarizing means also arranged beneath the supporting means for directing polarized light upwardly through the sheet to form a second band of polarized light upon said sheet extending at right angles with respect thereto, with the vibrations of said second band of polarized light extending lateral to the glass travel, the rays of light from each polarizing means being propagated to a common point, and a pair of analyzer units arranged above the sheet supporting means and to one side thereof, one analyzer unit being provided for and in position to receive the light transmitted upwardly through the sheet from the respective polarizing means.

7. In an inspection apparatus for sheet glass, the combination of means for supporting the sheet and carrying it forwardly, light polarizing means arranged at one side of the supporting means and including a plurality of polarizing units arranged side by side, each unit comprising a source of illumination and an inclined polarizing reflector arranged in opposition to the source of illumination in position to receive the light therefrom and reflect the polarized portion thereof through the glass sheet, the reflectors of the several polarizing units being so arranged with respect to one another and relative to the supporting means to form a band of polarized light extending across said sheet, with the vibrations of said polarized light extending substantially at an angle of 45 degrees with respect to the glass travel, separate light polarizing means arranged at the same side of the supporting means and also including a plurality of polarizing units arranged side by side, each comprising a source of illumination and an inclined polarizing reflector arranged in opposition to the source of illumination in position to receive the light therefrom and reflect the polarized portion thereof through the glass sheet, the reflectors of the several last-mentioned polarizing units being so arranged with respect to one another and relative to the supporting means to form a second band of polarized light extending transversely of said sheet, with the vibrations of said second band of polarized light extending lateral to the glass travel, and a pair of analyzer units arranged at the opposite side of the sheet supporting means, one analyzer unit being provided for and in position to receive the light transmitted through the sheet from the respective polarizing means.

8. In an inspection apparatus for sheet glass, the combination of means for supporting the sheet and carrying it forwardly, light polarizing means arranged at one side of the supporting means and including a plurality of polarizing units arranged side by side, each unit comprising a source of illumination and an inclined polarizing reflector arranged in opposition to the source of illumination in position to receive the light therefrom and reflect the polarized portion thereof through the glass sheet, the reflectors of the several polarizing units being so arranged with respect to one another and relative to the supporting means to form a band of polarized light upon said sheet extending substantially at an angle of 45 degrees across the same, with the vibrations of said polarized light extending parallel to the said band of light, separate light polarizing means arranged at the same side of the supporting means and also including a plurality of polarizing units arranged side by side, each comprising a source of illumination and an inclined polarizing reflector arranged in opposition to the source of illumination in position to receive the light therefrom and reflect the polarized portion thereof through the glass sheet, the reflectors of the several last-mentioned polarizing units being so arranged with respect to one another and relative to the supporting means to form a second band of polarized light upon said sheet extending transversely thereof, with the vibrations of said second band of polarized light extending lateral to the glass travel, and a pair of analyzer units arranged at the opposite side of the supporting means, one analyzer unit being provided for and in position to receive the light transmitted through the sheet from the respective polarizing means.

9. In an inspection apparatus for sheet glass, the combination of means for supporting the sheet and carrying it forwardly, light polarizing means arranged at one side of the supporting means and including a plurality of polarizing units arranged side by side, each unit comprising a source of illumination and an inclined polarizing reflector arranged in opposition to the source of illumination in position to receive the light therefrom and reflect the polarized portion thereof through the glass sheet, the reflectors of the several polarizing units being so arranged with respect to one another and relative to the supporting means to form a band of polarized light upon said sheet extending at right angles across the same, with the vibrations of said polarized light extending substantially at an angle of 45 degrees with respect to the glass travel, separate light polarizing means arranged at the same side of the supporting means and also including a plurality of polarizing units arranged side by side, each comprising a source of illumination and an inclined polarizing reflector arranged in opposition to the source of illumination in position to receive the light therefrom and reflect the polarized portion thereof through the glass sheet, the reflectors of the several last-mentioned polarizing units being so arranged with respect to one another and relative to the supporting means to form a second band of polarized light upon said sheet extending at right angles with respect thereto, with the vibrations of said second band of polarized light extending lateral to the glass travel, and a pair of analyzer units arranged at the opposite side of the sheet supporting means, one analyzer unit being provided for and in position to receive the light transmitted through the sheet from the respective polarizing means.

EMMETT L. WALTERS.